United States Patent [19]
Voois et al.

[11] Patent Number: 6,124,882
[45] Date of Patent: *Sep. 26, 2000

[54] VIDEOCOMMUNICATING APPARATUS AND METHOD THEREFOR

[75] Inventors: Paul A. Voois, Sunnyvale; Bryan R. Martin, Campbell; Philip Bednarz; Keith Barraclough, both of Menlo Park; Truman Joe, San Jose, all of Calif.

[73] Assignee: 8×8, Inc., Santa Clara, Calif.

[ * ] Notice: This patent is subject to a terminal disclaimer.

[21] Appl. No.: 09/005,053

[22] Filed: Jan. 9, 1998

Related U.S. Application Data

[63] Continuation-in-part of application No. 08/908,826, Aug. 8, 1997, Pat. No. 5,790,712, which is a continuation of application No. 08/658,917, May 31, 1996, abandoned, which is a continuation of application No. 07/303,973, Sep. 9, 1994, abandoned, which is a continuation of application No. 07/838,382, Feb. 19, 1992, Pat. No. 5,379,351.

[51] Int. Cl.[7] ............................................. H04N 7/14
[52] U.S. Cl. ................................. 348/15; 348/17
[58] Field of Search ........................... 348/12–20, 7, 348/407, 413, 415, 417, 423; 382/41, 56, 166, 232–236; 358/432; 364/723, 724.013; 379/202, 102.02; 345/502, 508, 505–506, 519; 712/23, 215, 35, 20

[56] References Cited

U.S. PATENT DOCUMENTS 3,873,771  3/1975  Kleinerman et al. .................... 370/384
3,937,878  2/1976  Judice ..................................... 348/798

(List continued on next page.)

FOREIGN PATENT DOCUMENTS

3640680 A1  6/1988  Germany .
61-159883   7/1986  Japan .
1175452     7/1989  Japan .
2 173 675   10/1986 United Kingdom .
WO 91/10324 7/1991  WIPO .

OTHER PUBLICATIONS

"Fernsehbilder in Schmalen Kanalen", *Funkschau Bildfernsprechen*, 58:104–106 (1986).

Anderson, J. et al., "Codec Squeezes Color Teleconferencing Through Digital Telephone Lines", *Electronics*: 113–115 (Jan. 26, 1984).

Chen, J. et al., "Real–Time Implementation and Performance of a 16 KB/S Low–Delay CELP Speech Coder", *IEEE*: 181–184 (1990).

(List continued on next page.)

*Primary Examiner*—Curtis A. Kuntz
*Assistant Examiner*—George Eng

[57] ABSTRACT

In one embodiment, a cost-effective videophone device includes a programmable processor circuit capable of communicating over a conventional communications channel, such as a POTS line, and of generating video data for display on a television set. The device includes a video source, an interface circuit, including a modem transmitting and receiving video and audio data over the channel; an EEPROM circuit for storing a program to control the videophone apparatus; and a display driver circuit for generating video data to the display. The programmable processor circuit includes a DSP-type processor for processing video data and a RISC-type processor executing the stored program and controlling the operation of the videophone apparatus. Further, a housing arrangement, enclosing each of the above structures, mounts adustably on the top of the display.

12 Claims, 6 Drawing Sheets

U.S. PATENT DOCUMENTS

| | | | |
|---|---|---|---|
| 4,099,202 | 7/1978 | Cavanaugh | 348/17 |
| 4,237,484 | 12/1980 | Brown et al. | 348/409 |
| 4,485,400 | 11/1984 | Lemelson et al. | 348/14 |
| 4,521,806 | 6/1985 | Abraham | 348/7 |
| 4,544,950 | 10/1985 | Tu | 348/485 |
| 4,593,318 | 6/1986 | Eng et al. | 348/385 |
| 4,715,059 | 12/1987 | Cooper-Hart et al. | 348/18 |
| 4,725,897 | 2/1988 | Konishi | 386/101 |
| 4,766,499 | 8/1988 | Inuzuka | 358/426 |
| 4,774,574 | 9/1988 | Daly et al. | 348/406 |
| 4,780,757 | 10/1988 | Bryer et al. | 348/7 |
| 4,780,758 | 10/1988 | Lin et al. | 348/7 |
| 4,789,895 | 12/1988 | Mustafa et al. | 348/464 |
| 4,829,372 | 5/1989 | McCalley et al. | 348/7 |
| 4,831,438 | 5/1989 | Bellman, Jr. et al. | 348/148 |
| 4,849,811 | 7/1989 | Kleinerman | 348/423 |
| 4,888,638 | 12/1989 | Bohn | 348/13 |
| 4,924,303 | 5/1990 | Brandon et al. | 348/7 |
| 4,943,994 | 7/1990 | Ohtsuka et al. | 348/17 |
| 4,955,048 | 9/1990 | Iwamura et al. | 348/17 |
| 4,962,521 | 10/1990 | Komatsu et al. | 348/18 |
| 4,963,995 | 10/1990 | Lang | 348/384 |
| 4,967,272 | 10/1990 | Kao et al. | 348/386 |
| 4,985,911 | 1/1991 | Emmons et al. | 348/17 |
| 4,991,009 | 2/1991 | Suzuki et al. | 348/415 |
| 5,073,926 | 12/1991 | Suzuki et al. | 348/17 |
| 5,130,792 | 7/1992 | Tindell et al. | 348/7 |
| 5,136,628 | 8/1992 | Araki et al. | 348/18 |
| 5,150,211 | 9/1992 | Charbonnel et al. | 348/462 |
| 5,164,980 | 11/1992 | Bush et al. | 348/17 |
| 5,212,742 | 5/1993 | Normile et al. | 382/56 |
| 5,276,866 | 1/1994 | Paolini | 709/219 |
| 5,347,305 | 9/1994 | Bush et al. | 348/14 |
| 5,410,649 | 4/1995 | Gove | 345/505 |
| 5,438,357 | 8/1995 | Mcnelley | 348/15 |
| 5,539,452 | 7/1996 | Bush et al. | 348/17 |
| 5,541,640 | 7/1996 | Larson | 348/19 |
| 5,926,208 | 7/1999 | Noonen et al. | 348/17 |

OTHER PUBLICATIONS

Chen, J., "High–Quality 16 KB/S Speech Coding With a One–Way Delay Less Than 2 MS", *IEEE*: 453–456 (1990).

Gerson, I. et al., "Vector Sum Excited Linear Prediction (VSELP) Speech Coding at 8 KBPS", *IEEE*: 461–464 (1990).

Maney, K., "MCI Device Turns TV Set into Video Phone", *USA Today*: 1B (Oct. 26, 1995).

Menez, J. et al., "A 2 ms–Delay Adaptive Code Excited Linear Predictive Code", *IEEE*: 457–460 (1990).

Rose, R. "Design and Performance of an Analysis–by–Synthesis Class of Predictive Speech Coders", *IEEE, Transactions on Acoustics, Speech and Signal Processing*, 38(9): 1489–1503 (Sep. 1990).

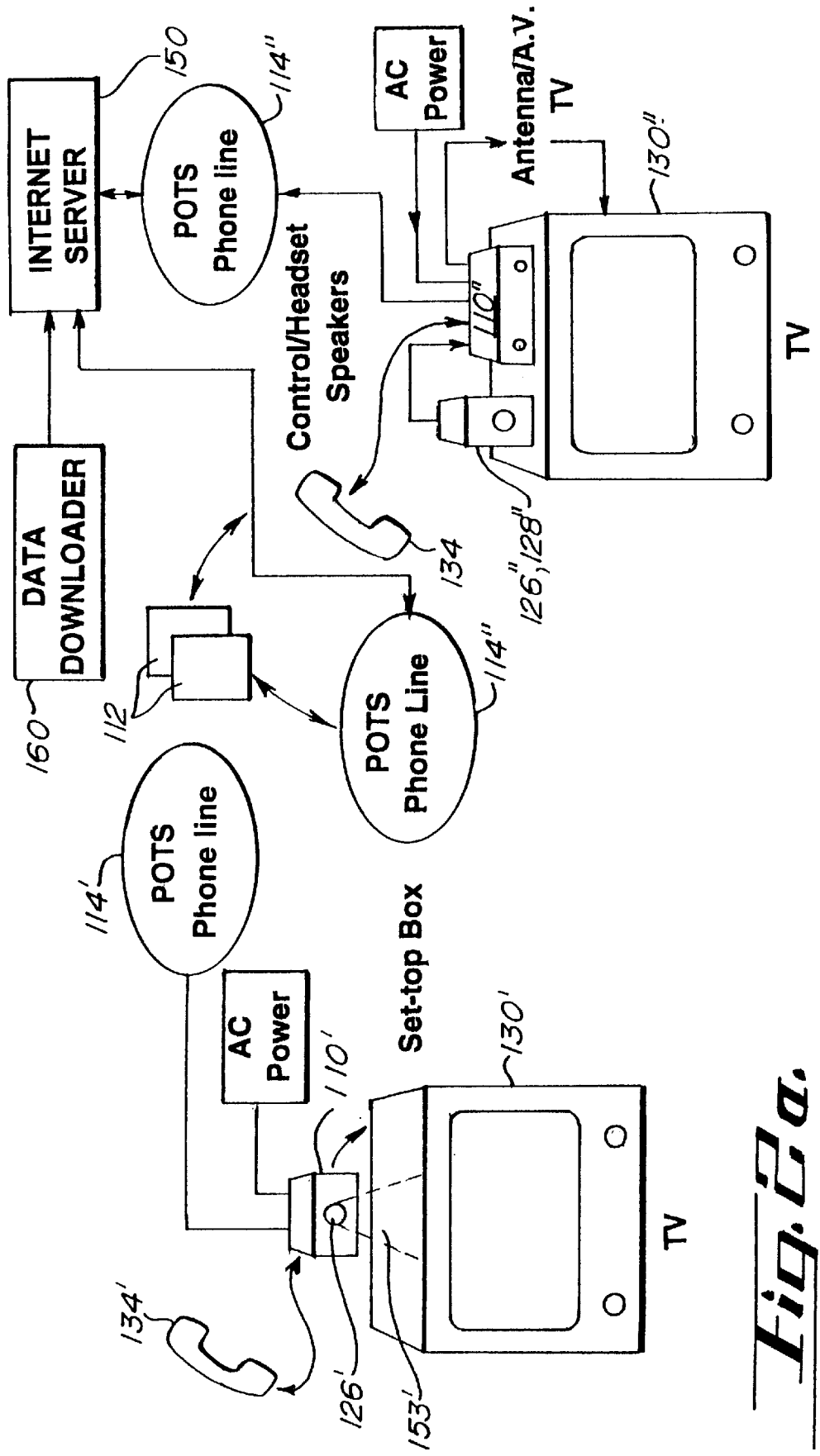

VIDEOCOMMUNICATING APPARATUS AND METHOD THEREFOR

This is a continuation-in-part of U.S. patent application Ser. No. 08/908,826, filed on Aug. 8, 1997 (now U.S. Pat. No. 5,790,712), which is a continuation of U.S. patent application Ser. No. 08/658,917, filed on May 31, 1996 (now abandoned), which is a continuation of U.S. patent application Ser. No. 07/303,973, filed Sep. 9, 1994 (now abandoned) entitled "Video Compression and Decompression Processing and Processors", filed Sep. 6, 1995, which is a continuation of U.S. patent application Ser. No. 07/838,382, filed on Feb. 19, 1992, (now U.S. Pat. No. 5,379,351).

RELATED APPLICATION

This application is also related to, and fully incorporates by reference, U.S. patent application Ser. No. 08/708,184, entitled "Video Compression and Decompression Arrangement Having Reconfigurable Camera and Low-Bandwidth Transmission Capability", filed Sep. 6, 1996, which is a continuation-in-part of U.S. patent application Ser. No. 08/457,516, entitled "Integrated Multimedia Communications Processor and Codec", filed May 31, 1995 (now abandoned).

FIELD OF THE INVENTION

The present invention relates to video communication systems, and more particularly, to a programmable videocommunicator architecture and an arrangement and method for videoconferencing over a conventional communications channel.

BACKGROUND OF THE INVENTION

Video communication systems span a variety of applications. One such application is videoconferencing. Videoconferencing typically involves the real-time sharing of video along with audio, graphics and/or data information between two or more terminals over a communications channel. A videoconferencing session may involve merely a video-enabled telephone call between two friends or, in a more complex application, involve a multi-way call among corporate boardrooms with advanced camera control and with sharing of data applications such as word processors and spreadsheets and using ISDN digital lines or TI lines for communication.

Videoconferencing technology has been evolving vary rapidly. The evolution began with a number of proprietary products, offered by various vendors and communicatively incompatible with each other. As the demand for equipment compatibility grew, vendors and scientific experts began to cooperate and, through a standards body such as the International Telecommunications Union (ITU), industry standards have been and are being adopted. This has typically involved the effort of an industry-wide consortium, such as the International Multimedia Teleconferencing Consortium (IMTC), to iron out implementation details of the standards, agree on the interpretation of sections of the standards that are unclear, and test each of the vendor's products against those provided by other vendors.

Once a baseline level of interoperability has been established, the vendors proceed to bring their standards-compliant products to market, and continue to add their own features to gain competitive advantage. While preserving standards compliance, the vendors differentiate their products from those of other vendors largely based on price and video/audio quality. The mass consumer market demands that such products provide audio/video quality with insubstantial communication-related delays and at extremely low costs. Accordingly, such demands have been difficult to meet.

SUMMARY OF THE INVENTION

The present invention is directed to a videophone apparatus and method for communicating video and audio data over a conventional communications channel. According to one example embodiment, a videoconferencing apparatus for communicating video and audio data over a plain old telephone service (POTS) line, comprises: a video source configured and arranged to capture images and to generate video data representing the images; a POTS interface circuit, including a modem, configured and arranged to transmit and receive video and audio data over the POTS line; a programmable processor circuit having a first section, including a DSP-type processor, configured and arranged to encode and decode video data, including the video data generated by the video source, according to a programmed video-coding recommendation, and having a controller section, including a RISC-type processor, communicatively coupled to the first section, the controller section executing a stored program for controlling operation of the videophone apparatus in response to user-generated commands; an EEPROM circuit coupled to the programmable processor circuit and arranged for storing the program for controlling operation of the videophone apparatus; a display driver circuit responsive to the programmable processor circuit and configured and arranged to generate video data for a display; and a housing arrangement, enclosing the video source, the POTS interface circuit, programmable processor circuit, EEPROM circuit, display driver circuit, and constructed and arranged to mount adjustably on the top of the display.

BRIEF DESCRIPTION OF THE DRAWINGS

Other aspects and advantages of the present invention will become apparent upon reading the following detailed description and upon reference to the drawings in which:

FIGS. 2a and 2b are perspective views of two example types of set-top boxes for use as part of a video communication system, according to particular embodiments of the present invention;

Figure 1A:
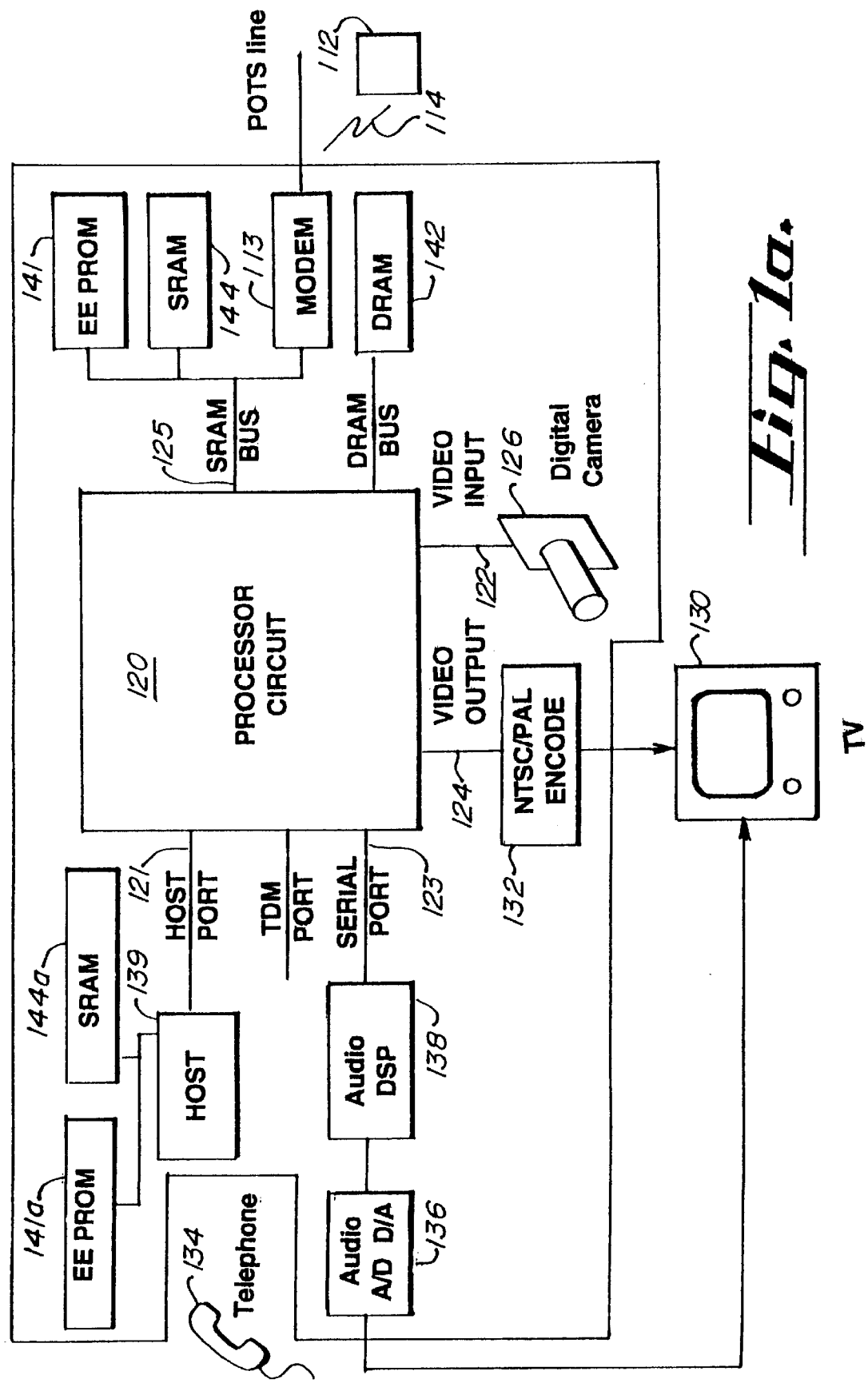
FIGS. 1a, 1b and 1c are block diagrams of example videophone communication systems, according to particular embodiments of the present invention.

While the invention is susceptible to various modifications in alternative forms, specific embodiments thereof have been shown by way of example in the drawings and will herein be described in detail. It should be understood, however, that it is not intended to limit the invention to a particular form disclosed. On the contrary, the invention is to cover all modifications, equivalents, and alternatives falling within the spirit and scope of the invention was defined by the appended claims.

DETAILED DESCRIPTION

The present invention is believed to be applicable to various types of data processing environments in which video is processed for transmission using a conventional transmission channel. In applications requiring real-time processing of video and audio data types of input data sources, such as videoconferencing, the present invention has been found to be particularly advantageous in that it is readily and inexpensively implemented. An appreciation of the invention may be ascertained through a discussion in the context of such a real-time application. The figures are used to present such an application.

Turning now to the drawings, FIG. 1a illustrates an example videophone communication system, according to a particular embodiment of the present invention. The system of FIG. 1a includes a first terminal 110 communicating with a second, similarly-constructed terminal 112. The communication takes place using a conventional modem circuit 113 for transmitting (and receiving) audio and video data over a communications channel 114. In a certain example embodiment, the first terminal 110 is implemented in a manner consistent with one of various set-top box units available from 8×8, Inc. of Santa Clara, Calif. The communications channel 114 can be implemented using a variety of available pathways, including the illustrated POTS phone line (central office not shown).

For further information concerning the construction and operation of such set-top units, reference may be made to 8×8's manuals and brochures for models VC100/105, VC50 and VC55 (attached as appendices A through J), and to U.S. Utility patent application Ser. No. 08/796,909, filed on Feb. 6, 1997 (Docket No. 11611.17US-01), entitled "Device for Mounting and Adjusting a Video Phone and Methods Thereof," and to U.S. Design patent application Ser. No. 29/072,368, filed Jun. 16, 1997 (Docket No. 11611.33-US-01), entitled "VideoPhone Design," each of which is incorporated herein by reference.

The terminal 110 includes a processor circuit 120 with separate digital video buses 122 and 124 for video input and video output, respectively. The input video bus 122 is used to receive video data from a video source such as a digital camera 126 (illustrated as being internal to the terminal 110). Alternatively, the digital camera 126 can be replaced with an analog camera and an NTSC/PAL decoder, such as the BT827 available from Brooktree, Inc., and either arrangement can be implemented internal or external to the housing enclosing the processor circuit 110 and its related circuits. The output video bus 124 is used to send video data for display to a monitor 130. Using a television-type monitor, the video data may first be encoded by a NTSC/PAL-type encoder 132, such as the BT866 or BT856 available from Brooktree, Inc.

The processor circuit 120 interfaces user audio to a microphone-speaker arrangement 134 through a conventional two-way analog-to-digital converter 136, such as the CS4218 available from Crystal Semiconductor, Inc. In this particular embodiment, the microphone and speaker arrangement 134 is realized using an ordinary telephone. In addition, the audio output is routed to the TV 130 for reproduction over the TV speaker. In one embodiment, an audio DSP (digital signal processor) 138 is used between the converter 136 and the processor circuit 120 for compressing and decompressing audio. An example DSP is the AD2181 from Analog Devices, Inc. In another embodiment, the audio DSP 138 is bypassed and the processor circuit 120 is programmed to provide the audio compression and decompression.

The example implementation of FIG. 1a includes different types of memory circuits connected to the processor circuit via the SRAM bus 120. A nonvolatile, electrically-erasable programmable memory 141, such as an EEPROM (including but not limited to flash memories), is used to store program-related data used by the processor circuit 120 to operate the terminal 110. This data includes program data executable by the processor circuit 120, unit-identification data and configuration and set-up data and parameters, such as may be required to interface the terminal 110 with selected Internet servers. A DRAM memory 142 is used to store video and audio data, for instance, in connection with processing for videoconferencing communications. An SRAM memory 144 is used to store executable program-type data, frequently-used data and stack data for general-purpose processing tasks. The SRAM is also used to store buffers of compressed video and audio data and input/output (I/O) data transferred via the serial port 123 and host port 121 to external devices.

The embodiment of FIG. 1a includes a modem circuit 113 connected to the main processor circuit via the SRAM bus 125. This is a "memory-mapped" connection in which the modem circuitry is enabled via the bus address lines and data is transferred to and from the modem in a parallel manner via the bus data lines. One embodiment of the modem circuitry uses the ACV288ACI chipset available from Rockwell, Inc.

In other embodiments, a host controller 139 is coupled to the processor circuit 120 via a host interface port, is used to provide overall control to the terminal 110. The host controller handles tasks such as call control, user interface, handshaking with the remote terminal and multiplexing of compressed audio and video data received from the processor circuit 120. The host controller uses external non-volatile memory such as EEPROM 141a to store programs for both itself and the processor circuit 120. These programs may be changed during a download process from a server, as is subsequently discussed. The host controller 139 also uses its own SRAM 144a to run the host programs. In this embodiment, the processor circuit 120 does not require its own EEPROM 141 since the host controller 139 can load its programs through the host port, and it uses a smaller SRAM 144 since the SRAM 144a is used for part of the program. The host processor can be implemented as any of a variety of commercially available general-purpose processor circuits, such as the 68302 available from Motorola, Inc.

Using a conventional DTMF-type telephone as the microphone-speaker arrangement 134, a user can also enter commands for controlling the operation of the videophone apparatus by depressing the keys on the telephone. For a discussion of example types of key-input commands that may be used to control terminal 110, reference may be to U.S. patent application Ser. No. 08/706,486, filed on Sep. 4, 1996, 1997, entitled, "Telephone Web Browser Arrangement and Method" (Docket No. 11611.03-US-01), and Ser. No. 08/861,619, filed on May 22, 1997, entitled, "Arrangement for Controlling the View Area Of a Video Conferencing Device and Method Therefor" (Docket No. 11611.47-US-01).

Figure 1B:
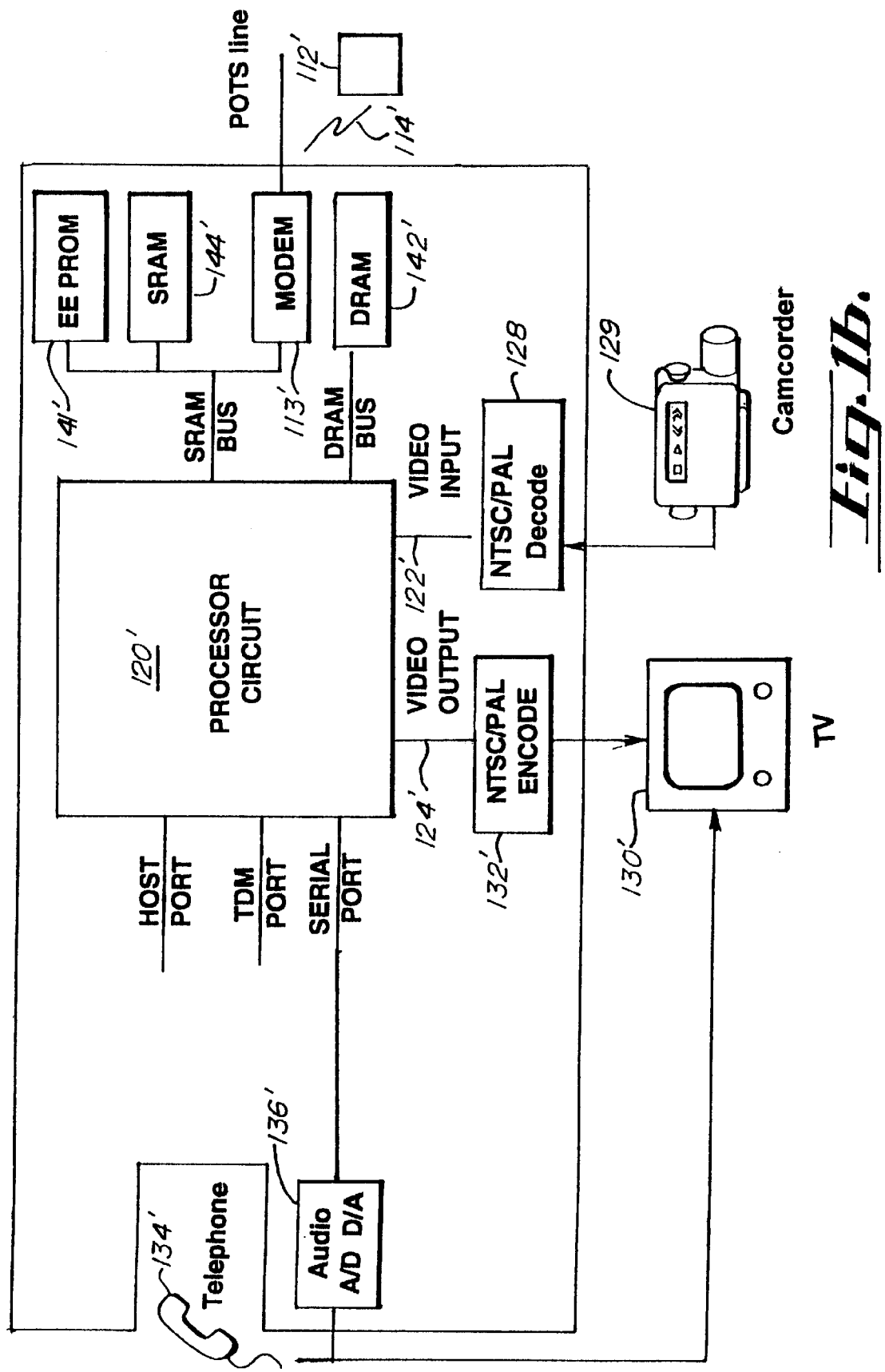

FIG. 1b shows yet another embodiment, according to the present invention, in which the digital camera 126 of FIG. 1a is replaced by an external video source such as camcorder 129 which connects to an STB unit, implemented as an NTSC/PAL decoder 128. The decoder 128 converts the camcorder video signal into a digital form suitable for interface to the video input of the processor circuit 120'. This embodiment is consistent with the VC50 STB from 8×8, Inc., as illustrated and described in VC50 Users manual (attached as Appendix A).

Figure 1C:
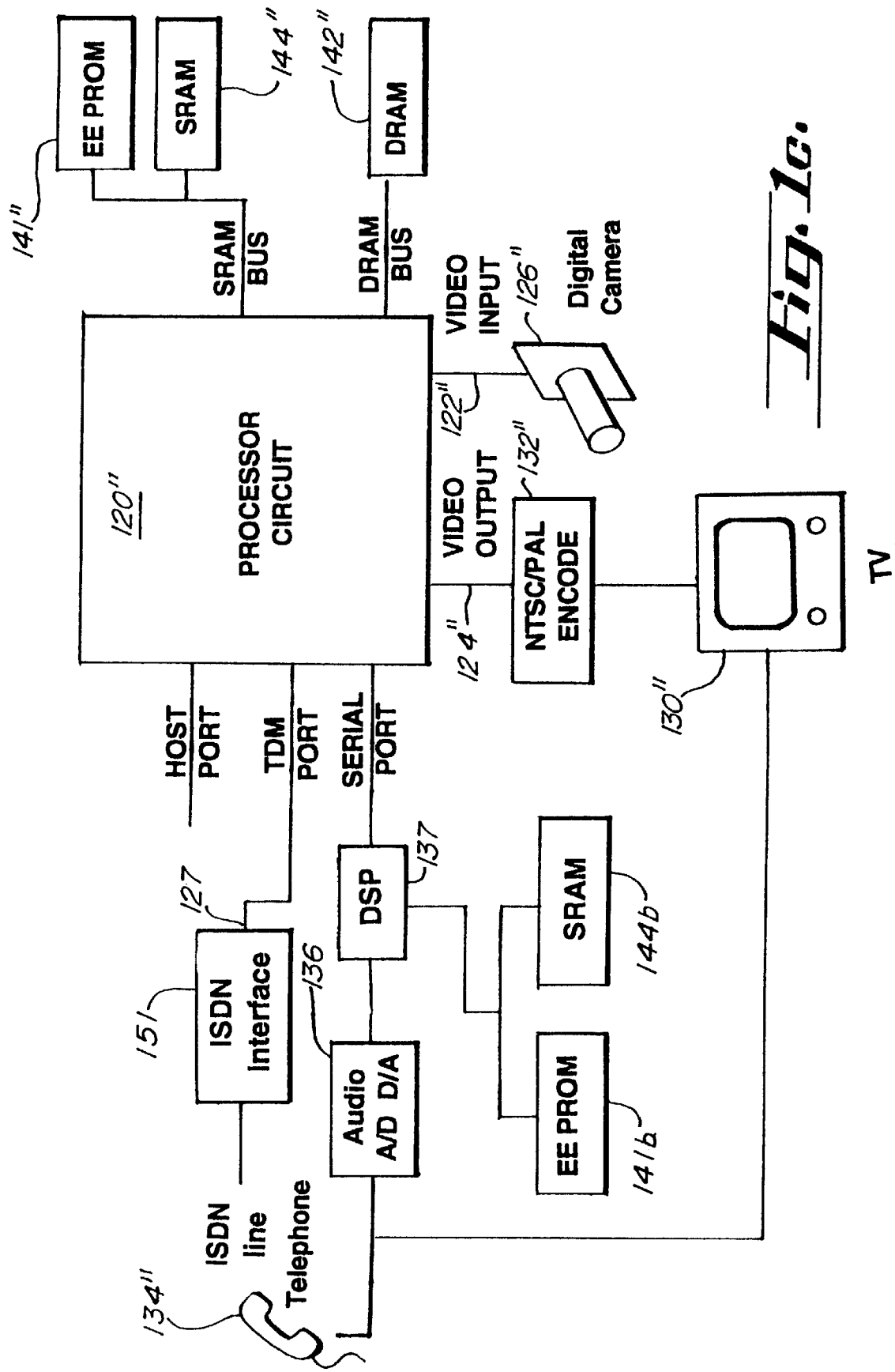

FIG. 1c shows yet another embodiment, according to the present invention, in which the STB unit transmits over an ISDN digital line rather than over a POTS line. In this embodiment, the compressed audio and video data are transmitted from the processor circuit 120" via the TDM serial port 127 to an ISDN interface circuit 151, which connects directly to the ISDN line. ISDN interface circuits are commercially available, for example, from Siemens Corp. This configuration may be used in three modes. In the first mode, the processor circuit 120" implements the H.320 videoconferencing standard, which is normally used on IDSN lines. A DSP 137, which is connected to the processor TDM serial port, performs audio compression and decompression to allow the processor circuit 120 to concentrate its available processing power on video processing. A typical H.320 call operates at a data rate of 128 blips.

In the second mode supported by the configuration in FIG. 1c, the processor circuit 120" implements the H.324 standard, which is normally used for POTS lines. In this mode, known as "~H.324 - over - IDSN~", V.34 modem specified by H.324 standard is implemented on the DSP 137 which also passes raw audio data from the audio D/A, A/D to the processor circuit 136". The rest of the H.324 standard (including audio compression and decompression) is implemented on the processor circuit 120". The V.34 data stream generated by the DSP 137 is passed through the processor circuit 120" and is transmitted over the ISDN line. This configuration allows the ISDN terminal of FIG. 1c to communicate with POTS terminals using a central office to perform the digital-to-analog conversion from ISDN to POTS.

The third mode supported by the ISDN terminal of FIG. 1c, known as "H.324/I" and is standardized as part of the H.324 standard, annex D (to be adopted by the ITU in Jan. 1998), is similar to the second mode except that the V.34 modem is completely eliminated. In this mode the DSP 137 simply passes raw audio data from the audio D/A - A/D 136" to the processor circuit 120", which implements to the H.324 standard including audio and video compression. The compressed audio and video data are mixed and then transmitted directly on the ISDN line digitally without any modulation. This mode allows two ISDN terminals to communicate using H.324/I which is considered by many skilled in the art to be a superior standard to H.320. Accordingly, the configuration of FIG. 1c allows a single ISDN terminal to operate in H.320, H.324-over-ISDN, and H.324/I modes, thus allowing interoperability with a wide range of remote terminals.

Also in accordance with the present invention, FIGS. 2a and 2b illustrate perspective views of set-top (box) units 110' and 110", respectively, for positioning on top of a monitor such as a television (TV) or computer display 130' or 130". Each of these units 110' and 110" is implemented using circuitry consistent with the first terminal 110 of FIG. 1a, and each unit 110' or 110" is configured to communicate with a similarly-configured terminal 112' or 112" over a conventional communications channel such as illustrated POTS line 114' or 114" (or another channel type such as an ISDN, LAN, USB or ethernet line).

The coupled communications channel may also be used to connect either of these units 110' and 110" to an Internet server 150. Using the example circuit configuration of FIG. 1a, the terminal 110' or 110" is configured to communicate with the Internet server 150 using the processor circuit 120 of FIG. 1 to schedule the transfer of control and video data through the modem 113. The TV 130 displays the video data received over the modem 113, and the control/handset 134 is used to select features and input data to the server 150.

As with the configuration of the terminal of FIG. 1a, each of the units 110' and 110" includes connections to a power line, to a control/handset such as a telephone or an IR remote (each including a keypad) to provide user control, and to the antenna and/or audio/video input of a TV for displaying video. The terminal 110" of FIG. 2b differs from the terminal 110' of FIG. 2a in that the former also includes a line for receiving video from an external video source, such as a commercial video camera 216"/128". Because the terminal 110" of FIG. 2b does not include a camera, the terminal 110" does not use an adjustable mounting arrangement such as the lower base component 153 of FIG. 2a.

For further information concerning the transfer of control and video data between the server 150 and the terminal 110' or 110" or various features of the terminal 110' or 110", reference may be made to the attached appendices and previously-referenced patent applications.

The coupled communications channel may further be used to connect either of these units 110' and 110" to a down-loader server 160. Once again using the example circuit configuration of FIG. 1 a, the terminal 110' or 110" is configured to communicate with the down-loader server 160 using the processor circuit 120 of FIG. 1a to schedule the transfer of new or revised data received over the communications channel through the modem 113 and stored in nonvolatile memory 141. Using a programmable multiprocessor configuration for the processor circuit 120 of FIG. 1a, the terminal 110 of FIG. 1a can accomplish such data revisions efficiently and without significantly increasing the cost or complexity of the terminal. Each illustrated "server" can be implemented using a variety of programmable computing equipment, including but not limited to a desktop personal computer, another videoconferencing terminal, an Internet server (as mentioned above) and a mainframe computer.

Another important aspect of one particular embodiment of the present invention involves use of the processor circuit 120 to provide an automatically-answer mode. In this mode, the processor circuit 120 is programmed to receive a command that configures the terminal to automatically answer the phone when it rings. Once the phone call is answered, an acknowledge signal may be provided to the calling terminal or phone, and the answering terminal waits for receipt of a secret code using, for example, the control channel to pass a code entered by depressing keys on the control/handset (or telephone) at the calling terminal. This configuration is advantageous for security or monitoring applications because it permits a user, located at a remote location, to view the image in front of the camera.

Another important aspect of one particular embodiment of the present invention involves use of the processor circuit 120 to provide video-source control from a remote location. In this mode, the processor circuit 120 is programmed to process the video from one of three video sources (or cameras) connected, for example, to the terminal of FIG. 1b, and to respond to a remotely generated "select" command (for example, using a command passed over the control channel) causing one of the video sources to be selected by a remotely-located user. This configuration is also advantageous for security or monitoring applications, as well as multi-image videoconferencing calls. For further information on this and the previously discussed mode, reference may be made to the attached appendices for the VC50 and VC55 products.

Another important aspect of the present invention involves using the processor circuit 120 to download the program-related data stored in the nonvolatile memory 141. As mentioned above, wide-spread sales of video-terminal equipment are problematic partly due to the many types of available compression/decompression algorithms, high-cost modification in adding different peripheral items to accommodate the various compression standards, and their need of various types of peripheral equipment to implement different image-capturing functions such as full motion video, still pictures and photo scanned images. Providing low-cost, wide spread sales of such video terminals is in tension with accommodating the various algorithms and functions demanded by users of this equipment. However, using a data-revision method in conjunction with a programmable multi-processor architecture to implement the processor circuit 120, these seemingly contradicting goals can be made consistent with one another. Before discussing an example manner of such data-revision and various advantages realized in the context of a videocommunicator such as that illustrated in the above-discussed figures, it is helpful to consider how such a programmable multiprocessor architecture can operate.

Figure 3:
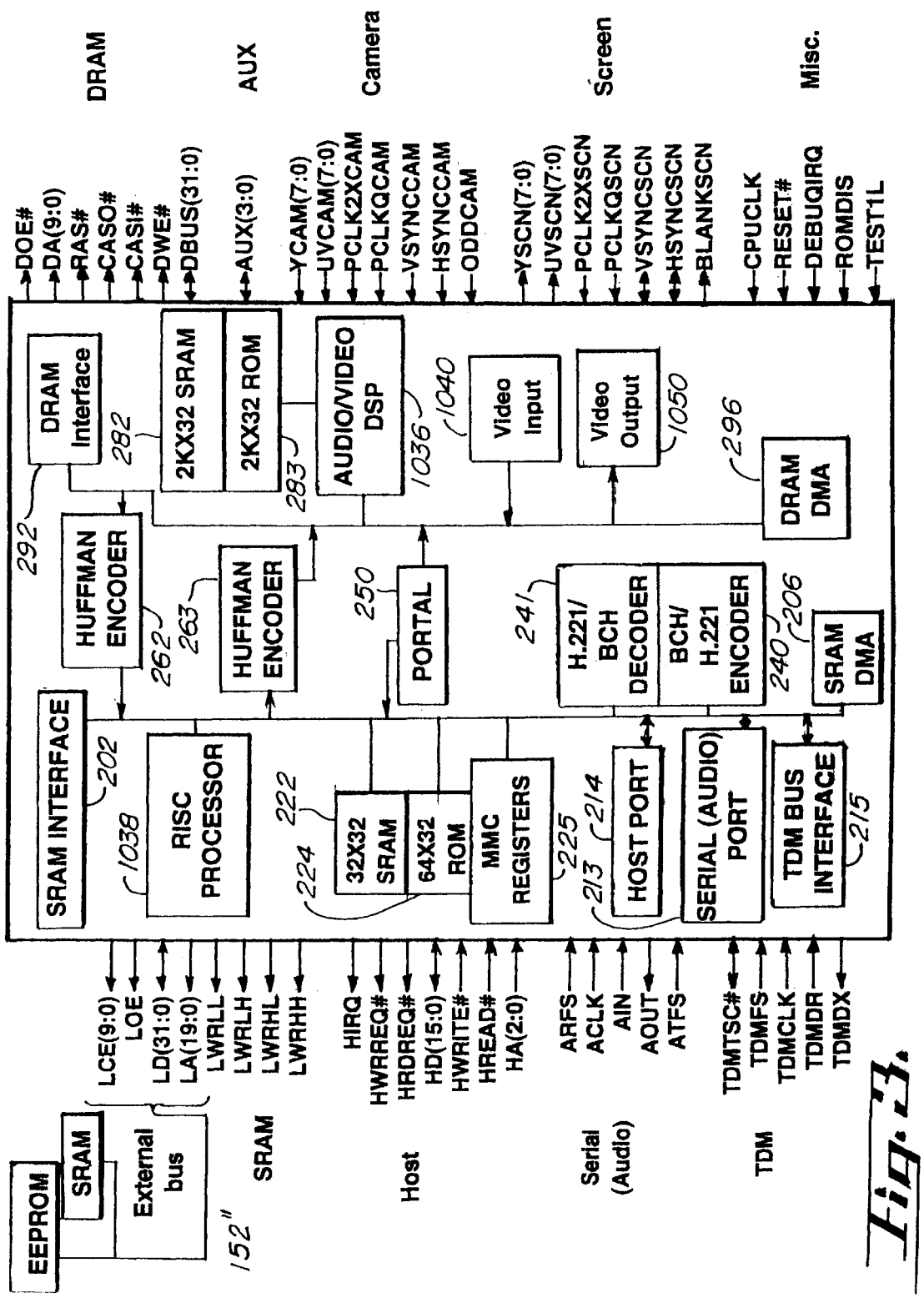
FIG. 3 is a specific block diagram of an example videoprocessor circuit, which may be used to implement one or more of the systems depicted in the above figures.

FIG. 3 shows an example multiprocessor configuration for the processor circuit 120 of FIG. 1. In this particular configuration, depicted as processor circuit 1024 and referred to as the "MPA" (multimedia processor architecture), the multiprocessor configuration includes a digital signal processor (DSP) 1036 for high-complexity audio and video processing, a reduced instruction set computing (RISC) processor 1038 for general-purpose processing and system control, a digital video input section 1040 for interface to an external video source, a digital video output section 1050 for interface to an external video display circuit, a serial audio port 213 for interface to external audio input and output, an SRAM interface 202 to an external SRAM bus and a DRAM interface 292 to an external DRAM bus. The MPA 1024 is illustrated as a programmable audio/video codec and multimedia communications processor and is suitable for implementation as a single chip or using multiple chips, depending on the targeted application and development/sales cost criteria. The MPA requires only memory and interface circuits for implementation of a complete multimedia and conferencing subsystem. A particular implementation of the MPA is available from 8×8 Inc., of Santa Clara, Calif. It is a single-chip implementation referred to as "VCP." For farther details, reference may be made to the publication "VCP Datasheet", available from 8×8, Inc.

Within the MPA 1024, there exist two main programmable processing units, a RISC processor 1038 and a DSP 1036. The RISC processor supervises hardware resources for the input and output of audio and video data, the processing and compression/decompression of such data, the multiplexing and de-multiplexing of compressed audio and video data, error correction and error correction coding, handshaking with remote terminals during a videoconferencing call, and interface to a user input device. The address space of the RISC processor 1038 includes an internal ROM 224, an internal SRAM 222, MMC ("memory-mapped control") registers 226, and an SRAM interface 202 that connects to external memory such as SRAM, RAM or EEPROM, on a bus 152.

The internal ROM 224 contains a boot routine that the RISC microprocessor 1038 executes at start up. The memory bus 152 connects to external memory that contains programs, data, and stack memory for the RISC processor 1038 and memory for the compressed audio and video data buffers, as well as data transferred through the host port 214, the serial audio port 213, and the TDM port 215. The internal SRAM 222 is for frequently used register data, which may be accessed by RISC processor 1038 simultaneously with the access to external program or data memory via SRAM interface 202 by the RISC processor 1038. The MMC registers 226 allow the RISC to control the hardware input, output and processing resources, including the video processor 1036 that are coupled to the first and second data buses 204 and 294, respectively.

In one embodiment of the invention, the RISC processor 1038 is a microprocessor which implements an enhanced MIPS-X instruction set. The MIPS-X instruction set is described in "MIPS-X Instruction Set and Programmers Manual," Technical Report No. 86-289 by Paul Chow, available from 8×8, Inc., which is incorporated by reference herein in its entirety. In this embodiment, the RISC processor 1038 has 32 bits of program instruction and 32 bits of pipeline data. The memory interface 202 has an isolation circuit connected to the instruction data bus 208 and the first data bus 204. When the risk processor 1038 executes an instruction that accesses data in the internal SRAM 222, the isolation circuit loads the data from the SRAM 222 while simultaneously fetching the next program instruction from the external bus 152. For further information concerning the pipelined operation of an example embodiment of the RISC processor 1038, reference may be made to the above-discussed MIPS-X documentation. To improve the efficiency of 8-bit and 16-bit operations, the MIPS-X instruction set is augmented to include the instructions disclosed in Appendix A of the previously-mentioned patent application, entitled "Video Compression and Decompression Arrangement Having Reconfigurable Camera and Low-Bandwidth Transmission Capability", filed Sep. 6, 1996,. The RISC processor 1038 is programmable using "C" language compilers, which are available for MIPS-X processors.

The SRAM interface 202 controls accesses to mapped I/O devices such as standard SRAM or nonvolatile memories (ROM, EPROM, EEPROM and FLASH). A 32-bit data bus LD[31:0] and a 20-bit address bus LA[19:] connect the SRAM interface 202 with the external bus 152 but the memory interface 202 also supports 16-bit and 8-bit devices. The signals on 4 byte enable lines. LWRLL, LWRLH, LWRHL, and LWRHH determine which bytes in a 32-bit word are written to the external memory devices. The SRAM interface 202 supports four independent external address spaces for four banks of memory or mapped I/O devices. Four chip-enabled lines LC[3:0] from the SRAM interface 202 select the address space being accessed. Each address space has programmable bus width and weight states. The SRAM interface 202 and RISC processor 1038 thus support varied types of memories including SRAM, ROM, EPROM, EEPROM and flash and memory-mapped I/O devices.

The SRAM DMA section 206 provides for bi-directional DMA ("direct memory access") data transfers between external SRAM (via the SRAM interface 202 and the external bus 152) and the peripheral hardware devices connected to the SRAM bus 204. Such peripheral devices include the host port 214, the serial audio port 213, the TDM bus interface 215, the Huffman encoder 262, the Huffman decoder 263, the portal 250, the H221/BCH decoder 241, and the BCH/H.221 encoder 240.

The DSP 1036 is a programmable signal processor which implements video coding procedures such as motion estimation, loop filters, discrete cosine transforms (DCTs), and quantization and zigzag scanning, as may be required by a software-selected video protocol. It also implements audio coding procedures such as filtering, linear prediction, and codebook-based vector quantization, as may be required by a software-selected audio protocol. In particular, the DSP 1036 executes software which performs video compression operations required by the MPEG, JPEG, H.261 and H.263 standards, as well as proprietary video compression processes, and audio compression operations required by the MPEG, G.711, G.722, G.723, G.728, and G.729 standards, as well as proprietary audio compression processes. One embodiment of the DSP 1036 implements a SIMD ("simultaneous instruction multiple data path") architecture with the instruction set listed in the publication "VP Programmers Manual" by Hedley Rainnie (revised by Daniel Helman), which is available from 8×8, Inc., and is incorporated by reference in its entirety.

The DSP 1036 processes video and audio data by executing software stored in two local memories—an SRAM 282 and a ROM 283. The ROM 283 contains program segments that are used often or in multiple compression standards. Examples are DCT, finite impulse response filter and video motion search. The SRAM 282 contains program segments that are used less often or that are particular to a given compression standard. Examples are the codebook search routines that are defined in the G.723 standard and the half-pixel prediction routine as defined in the H.263 standard. A DSP program can be dynamically loaded into the SRAM 282 either in its entirety at startup (if the entire program fits at once), or in pieces during execution (if the program is too big to fit in the SRAM 282 at once). In the former case, the program may be loaded from external EEPROM by the RISC 1038 via the MMC registers 226. In the latter case, the program may be stored in external DRAM and loaded in pieces to the SRAM 282 via the DRAM bus 294.

The DRAM DMA section 296 provides for bidirectional DMA data transfers between external DRAM (via the DRAM interface 292) and the peripheral hardware devices connected to the DRAM bus 294. These devices include the DSP 1036, the video input 1040, the video output 1050, the Huffman encoder 262, the Huffman decoder 263, and the portal 250.

The portal 250 is connected to both the DRAM bus 294 and the SRAM bus 204. It allows the direct bi-directional transfer of data between these buses and is controlled by the RISC processor 1038 via the MMC registers 226.

The Huffman encoder 262 and the Huffman decoder 263 also allow transfer of data between the DRAM bus 294 and the SRAM bus 204. However, unlike the portal 250, the Huffman encoder 262 and the Huffman decoder 263 transform the data during this transfer. The transformation is directed to the entropy coding process, which is found in many video compression algorithms including JPEG, MPEG, H.261, and H.263. The data on the DRAM bus 294 contains run length/amplitude (RLA) information pertaining to an 8×8 block of quantized DCT coefficients. The coefficients are scanned in an order determined by the particular video compression standard. The scan results are stored as a sequence of RLA tokens, each token representing a string of zero coefficients followed by a non-zero coefficient. The token indicates the number of zero coefficients ("run lengths") as well as the amplitude and sign of the non-zero coefficient. In a particular embodiment, a token is represented on the DRAM bus 294 as a 32-bit value of which 6 bits represent run length, 11 bits represent amplitude, and 1 bit represents sign (14 bits are unused). The token on the SRAM bus 204, however, is represented in a variable-length code word (VLC) format, which is defined by a particular standard. The average length of a VLC code word is typically much less than 32 bits, resulting in compression of the token information. The Huffman encoder 262 converts the token data from the expanded format to the VLC format; the Huffman decoder 263 does the opposite.

The H.221/BCH decoder section 241 and the BCH/H.221 encoder section 240 provide hardware assistance to the software process that implements that H.221 multiplexer standard within the H.320 videoconferencing standard. This assist includes BCH error protection on the compressed video data.

The MPA architecture contains several input/output (I/O) interfaces to external devices. The SRAM interface 202 connects to external memory devices as discussed above. In addition, this interface may be used for "memory mapped control," in which a particular external device is connected to the SRAM bus and assigned a unique address for access by the RISC. Examples of such devices are a modem and light-emitting diode (LED) controller for status indication.

The host port 214 is a 16-bit parallel interface to a host controller (either a microcontroller or a computer). The MPA may be used in a slave mode, with the host controller in master mode. The host controller performs such operations as loading program software to the MPA, issuing commands, and receiving status indications, all through the host port 214.

The serial port 213 is a general-purpose, bi-directional synchronous serial interface. Typically, it is used for digital audio I/O, but other applications are possible, including a serial interface to an external DSP implementing a modem or other communications protocol.

The TDM bus interface 215 is a serial interface to a time division multiplexed (TDM) bus such as the multi-vendor interface protocol (MVIP) industry standard. It allows for the transmission of several data channels coalesced on a bit-by-bit basis into a single data stream. It is programmable and controlled by the RISC 1038 and may be configured to act like a standard serial interface, for example, to connect to a digital audio stream.

The video input section 1040 and the video output section 1050 interface to external digital video source and display equipment, respectively. The interface uses either the CCIR 601 or the CCIR 656 digital video standards. The video input section 1040 and the video output section 1050 are programmable and controlled by the RISC 1038 via the MMC registers 226. The video input 1040 may be configured to interface with a variety of digital video cameras or to a digital decoder chip, which is in turn connected to a composite video signal such as that from a camcorder or a VCR. The video output section 1050 may be configured to drive a video encoder chip, which in turn drives a TV or VGA monitor. Both the video input 1040 and the video output 1050 can be configured for NTSC or PAL timing, guaranteeing programmability for compatibility with TV and camera standards worldwide.

An important feature of the MPA is its flexibility and programmability. Each of the main processors, RISC 1038 and the DSP 1036, are fully software-programmable and can execute different programs to perform various tasks such as MPEG, videoconferencing, and Internet browsing. A single-system design may perform all these tasks by simply storing several programs in a non-volatile memory (such as ROM or EEPROM) and loading each program to the MPA as appropriate.

For the purposes of explanation, it is helpful to describe an example application of the MPA in a POTS videoconferencing system. This example is not intended to limit the potential uses of the MPA. Such a POTS videoconferencing system implements the H.324 standard consisting of: H.263 video compression, G.723 audio compression, H.223 multiplexer, H.245 control and handshaking, and V.34 modem. An example application illustrates the video and audio encoding process. The video encoding involves the MPA receiving video data via the video input 1040. The video input 1040 may scale the video data to a format suitable for compression. The video data is then stored in external DRAM via the DRAM DMA 296 and the DRAM interface 292. The video data is compressed by the DSP 1036 with the results of the compression being RLA tokens, as discussed previously, stored in external DRAM. Tokens are passed through the Huffman encoder 262, converted to the VLC format defined by the H.263 standard, and stored via the SRAM DMA 206 and the SRAM interface 202 in external SRAM. Alternatively, the RLA tokens may be passed through the portal 250, stored in external SRAM, and converted to VLC format in software by the RISC 1038. The audio-encoding involves receiving audio data from an external audio device through the serial port 213 and storing via the SRAM interface 202 in external SRAM. The data is then transferred to external DRAM via the portal 250. The DSP 1036 compresses the data according to the G.723 standard and the compressed data is transferred back to external SRAM. The RISC 1036 implements the H.223 multiplexer standard, which interweaves the compressed audio and video data into a single stream and transmits that stream to an external memory-mapped V.34 modem via the SRAM interface 202. The decoding process including demultiplexing, audio decompression and video decompression is the reverse of the encoding process described above. The DSP 1036 performs acoustic echo cancellation (AEC) on the audio data. The AEC process removes the component of the audio input that results from both acoustic coupling (caused by echoes off the walls of the room or direct coupling from the videoconferencing unit's speaker to its microphone) and electronic coupling (caused by feedback in the audio driver circuitry) of the audio output. The DSP 1036 also detects dual tone multiple frequency (DTMF) signals in the audio input and notifies the RISC 1038 of the presence of the DTMF signals. These signals may be used for control of the videoconferencing session via a touch-tone phone connected to the audio port 213. The RISC 1038 acts as the supervisor of the MPA hardware resources. In addition, the RISC 1038 performs call control and handshaking with the remote videoconferencing terminal according to the H.245 standard and controls the user interface by responding to external signals (such as DTMF tones from a telephone), changing the state of the session, and providing graphical feedback to the user via the video output 1050.

Figure 4:
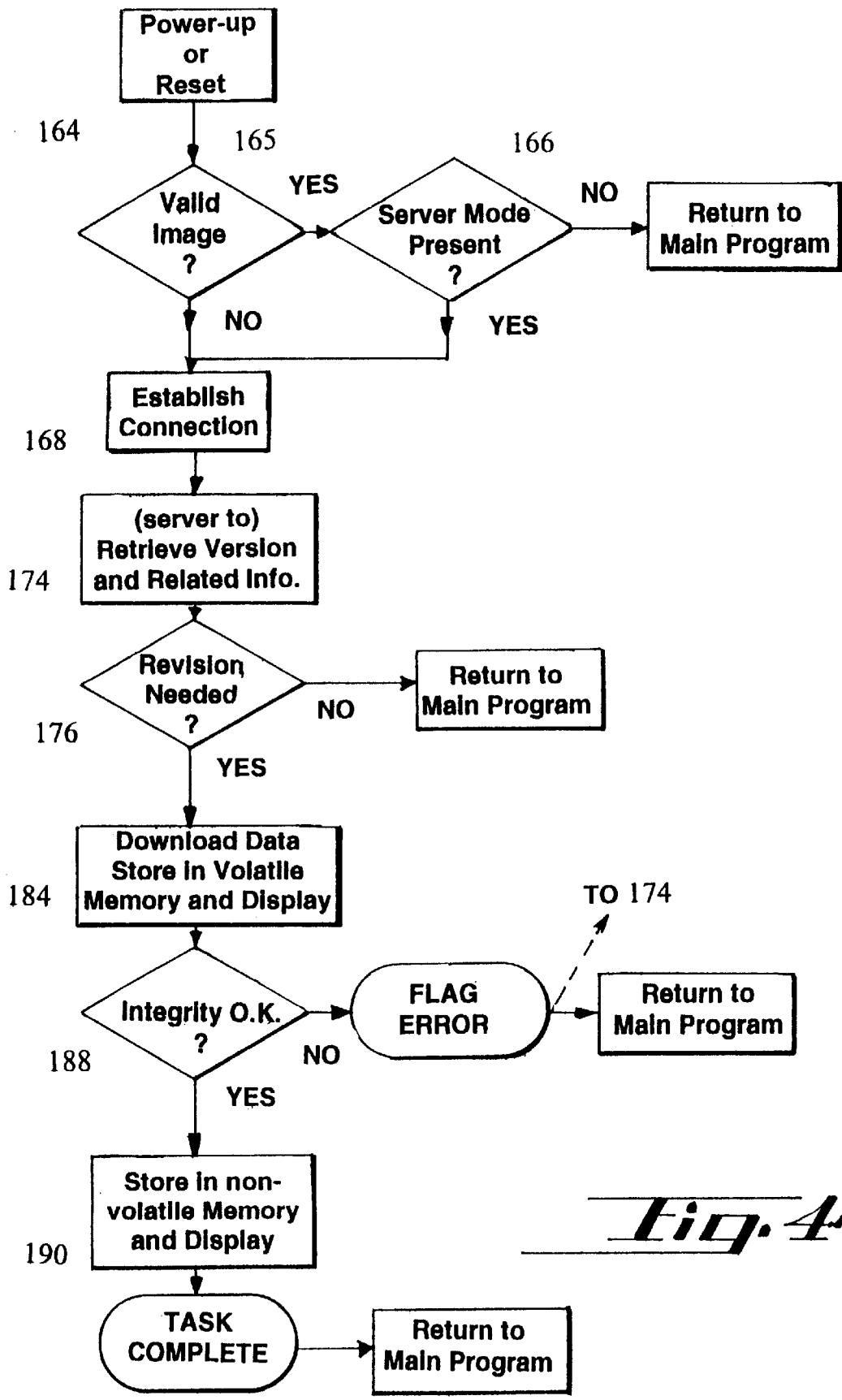
FIG. 4 illustrates one example method, according to the present invention, for updating data and/or interrogating memory in one or more of the systems depicted in the above figures.

FIG. 4 illustrates one example method of operation, according to the present invention, involving a server (or other properly-equipped terminal) communicating with the terminal of FIG. 1a or FIG. 2 to interrogate, and/or revise data in the memory for, the video processor circuit. The example flow of FIG. 4 assumes that the terminal has been previously programmed with a server interaction routine, including a set of valid server commands against which commands received can be compared to determine whether or not, and what aspects of, the server interaction routine should be executed. This permits the server to obtain control over the terminal in connection with an interrogation of, or a data revision to, the terminal. Example types of preprogrammed commands can include some or all of the following: display previously stored information or information to follow; verify checksum; retrieve and/or check diagnostics information; receive and store attached data; transfer data from first address group to second address group (e.g., between DRAM and EEPROM); look for inputs from control/handset or other input source; and determine if handset is off-hook. For many of these command types, the server commands are sent along with memory and/or I/O addresses to designate where the data is to be stored, removed or sent. Use of commands of this type permits the server to perform a variety of functions, including but not limited to performing diagnostics on the terminal and providing video and/or audio advertising and messaging for the terminal's user while a connection is established.

In an alternative embodiment (not illustrated in connection with FIG. 4), the terminal can be pre-programmed with a less-complex server interaction routine that is capable of receiving data and using this data to replace existing data in memory. For example, the terminal can be pre-programmed to respond to a server connection/command by storing all downloaded data in designated areas of the terminal's memory, and without more than a few server-based commands being used. Another nonillustrated variation includes all displayed information for the user of the terminal to originate from the terminal rather than the server.

In accordance with the example flow of FIG. 4, the video processor circuit of FIG. 3 can function independently from other applications being executed by the terminal. For example, the terminal can simultaneously support a videoconferencing or Internet connection while receiving revised data over the same communications channel from the remote server (e.g., 150 or 160 of FIGS. 2a and 2b) providing the videoconferencing or Internet connection. This can be accomplished by passing the revision data along with associated control information over a control channel which is multiplexed with the compressed video and audio channels. Because the video processor circuit is implemented using multiple processors operating simultaneously, the DSP-type processor can be used to execute the complex algorithms associated with the decoding and encoding of video (as well as audio) data while the overseeing (e.g., RISC-type or host) processor manages the data revision functions. For further information concerning the processing of these various channels of information, reference may be made to the following U.S. patent application Ser. No. , filed on Dec. 10, 1997, entitled "Data Processor Having Controlled Scalable Input Data Source And Method Thereof" (Docket No. 11611.15USI1), incorporated herein by reference in its entirety.

The example flow of FIG. 4 begins at block 164 in response to power-up or reset of the terminal. At block 165, the terminal (e.g., using the RISC-type processor or host of FIG. 1a as the supervising processor) determines if the image of the data in memory is valid. In one embodiment, this is accomplished by generating a conventional cyclic redundancy code (CRC) word from the data in nonvolatile memory and comparing the word to a known valid result. Also at block 165, the terminal can test for a valid digital signature based upon the generated CRC word. The encrypted digital signature can be implemented, for example, using public key digital encryption technology. This is advantageous in that software unauthorized by the manufacturer cannot be executed on the terminal. If the image is not valid, a message is displayed indicating that new software should be downloaded from the server.

To minimize the risk of data tampering, additional protection to the data stored in the terminal's memory can be provided by locating the data revision routine (e.g., as implemented using the flow of FIG. 4) within a single segment of nonvolatile memory, and by write-protecting the routine through software and/or hardware. In one particular implementation, the routine does not accept commands to overwrite itself or any location within its address space. To update the routine of FIG. 4, an external application is downloaded to update the routine of FIG. 4. When the external application is executed, it installs a new data revision routine in nonvolatile memory. This new data revision routine is then used to download other external applications such as a web browser, a new download routine, new compression standards, a DVD player, etc.

If the image is valid, flow proceeds from block 165 to block 166 where the terminal determines if there is a valid indication to enter a server response mode. In various embodiments, a valid indication is present when one or more of the following conditions is detected: a power-up or reset, while the control/handset (implemented as a telephone) is in an off-hook position; a special sequence of keyed-in data (or other special code) is received from the control/handset; a special command is received during a video call, for example, over the control channel; and a special sequence of keyed-in data (or other special code) is received from a peripheral interface. In one embodiment, the terminal is communicatively coupled to an extension unit (acting as a server) and receives a special server mode indication as well as server commands from the extension unit. One exemplary extension unit that may be used for this purpose is illustrated and described in U.S. patent application Ser. No. 08/977,568, filed on Nov. 25, 1997, and entitled, "Videoconferencing Extension Unit for Peripheral Interfaces" (Docket No. 11611.52-US-01), incorporated herein by reference in its entirety.

In another embodiment involving two connected terminals, the terminals compare their respectively stored program versions and the terminal with the most recent version acts as a server to download the most recent version to the other terminal. In yet another similar embodiment, rather than acting as the sever and automatically downloading, the terminal with the most recent version informs the other terminal that its program version is out of date and that it should be revised.

For purposes of discussing the example flow of FIG. 4, it can be assumed that the terminal determines that there is a valid indication to enter the depicted server response mode when a power-up or reset occurs while the control/handset (implemented as a telephone) is in an off-hook position. An advantage of this condition is that it permits the terminal to initiate the data-revision functions without any special command having to be entered by the user.

If the server mode indication is not present at block 166, the terminal exits this routine and flow proceeds from block 166 to the main program, as indicated in FIG. 4 by the "*". If the server mode indication is present, flow proceeds to block 168 where a connection is established with the server if a connection with the server is not already established. It will be appreciated that such a connection can be established using any of the various types communication channels or input interfaces discussed herein.

At block 174, a connection is established and the terminal waits to receive a command from the server. As mentioned above, the terminal's memory stores codes representing valid commands that can be received from a server and acted upon. In other embodiments, these commands can be received in various ways, such as: a keyed-in command from a user of the terminal, e.g., using the control/handset or the above-described extension unit; over the control channel while videoconferencing; and, as illustrated in FIG. 4, from a server over a communications channel (via a modem). In one particular application, the first command sent from the server requests that the terminal return its stored program version information and ID/serial number. According to a particular embodiment using this application, each unit has an ID/serial number stored within its flash memory allowing the server to keep track of identity and location of unit. This permits the server to keep a data base of information including phone numbers and where the unit can be found. The server data base can also include credit card information for automatic billing when an upgrade is obtained.

From block 174, flow proceeds to block 176 where the server determines if the data in the terminal's memory requires an update. If an update is not required and no command other than a "revise data" type command has been received, flow returns to the main program with a possible report to the terminal's user via the display and/or speakers (telephone speaker(s) or television speakers). If an update is required, flow proceeds from block 176 to block 184 where the terminal receives the revision data from the server, stores the retrieved data in volatile memory (e.g., DRAM), and reports the amount or percent of data being retrieved for the user on the display. The server may update all or only part of the remote terminal's memory. Because the server has the program information of the terminal, it needs only to send the terminal the differences between the latest program version and the currently stored program version. In another embodiment, the terminal is programmed to permit the server to update the video memory buffer of the terminal while downloading, thereby causing display messages and/or advertisements on the display.

At block 188, the terminal (and/or the server) determines if this newly stored data is valid. This can be accomplished by verifying the data using CRC checksums as it is being retrieved and/or upon completion of the entire retrieval. In one particular embodiment, this validation of retrieved data permits the routine of FIG. 4 to resume an interrupted downloaded stream of data when interrupted, or connection lost, at the point of the interruption upon reconnection to the server. If the data is not valid, the terminal can indicate this to the server (or the server can determine this error on its own through interrogation) as indicated at block 188 and an attempt can be made to repeat the data retrieval or the task can be considered completed with the error displayed for the user.

To maximize error-free delivery of data, the data can be transported between the server and the terminal using "I"-frames in accordance with the ITU V.42 standard. In this manner, errors are detected using a CRC code and, for packets in which errors are found, the packets are retransmitted.

If the retrieved data is valid, flow proceeds from block 188 to block 190 where the retrieved data is transferred from volatile memory to non-volatile memory, and the successful update status is displayed for the user. By first receiving and storing data in volatile memory, validated data can be quickly transferred to non-volatile memory in one fast transfer to minimize risk of corrupting the nonvolatile memory due power outage or loss of connection with the server. This is done because if the download process were interrupted while writing to flash memory, the image stored would be inconsistent and the application would not run. By downloading first to volatile memory and then transferring to nonvolatile memory, the window in which we are susceptible to this problem is minimized. The transferred data can once again be validated in non-volatile memory. The data update can either be an entire new ram image of the applications or can be a subset of only certain locations which are to be changed. The routine can read and/or write to any location within flash memory. This includes user settings and preferences to applications as well as application programs.

By using the server to control and feed information to the connected terminal, various applications can be realized. To name a few, these applications include: software-based updates to upgrade, retrieving diagnostic information, change or parameterize the terminal; display messages about the operation of the updates, about the manufacturer, about other products or service in the form of advertisements, and real-time audio and video showing the operator at the server end. As mentioned previously, using the capabilities of a video processor with a programmable multiprocessor architecture, these videoconferencing-related features can be implemented individually or in combination with one another, using a relatively low-cost structure such as a set-top unit.

The present invention has been described with reference to particular embodiments. These embodiments are only examples of the invention's application and should not be taken as a limitation. Various adaptations and combinations of features of the embodiments disclosed are within the scope of the present invention as defined by the following claims.

The following appendices are attached hereto:

A. ViaTV Modular Videophone Owner's Guide for Models VC50 and VC55;

B. ViaTV Web Browser Owner's Guide;

C. ViaTV Modular Videophone Quick Start Guide for Models VC50 and VC55;

D. ViaTV Phone Owner's Guide for Models VC100/VC105;

E. ViaTV Phone Owner's Guide for Model VC100;

F. Addendum to Owner's Guide for ViaTV Phones VC100/105 Version 4 Software Upgrade;

G. Addendum to Owner's Guide for ViaTV Phones VC50/VC55 Version 4 Software Upgrade;

H. ViaTV Phone Model VC50 Brochure;

I. ViaTV Phone Model VC105 Brochure; and

J. ViaTV Phone Model VC55 Brochure.

What is claimed is:

1. A videoconferencing apparatus for communicating video and audio data over a plain old telephone service (POTS) line, comprising:

a video source configured and arranged to capture images and to generate video data representing the images;

a POTS interface circuit, including a modem, configured and arranged to transmit and receive video and audio data over the POTS line;

a programmable processor circuit having a first section, including a DSP-type processor, configured and arranged to encode and decode video data, including the video data generated by the video source, according to a programmed video-coding recommendation, and having a controller section, including a RISC-type processor, communicatively coupled to the first section, the controller section executing a stored program for controlling operation of the videoconferencing apparatus in response to user-generated commands;

an EEPROM circuit coupled to the programmable processor circuit and arranged for storing the program for controlling operation of the videoconferencing apparatus;

a display driver circuit responsive to the programmable processor circuit and configured and arranged to generate video data for a display; and a housing arrangement, enclosing the video source, the POTS interface circuit, the programmable processor circuit, the EEPROM circuit, the display driver circuit, and constructed and arranged to mount adjustably on the top of the display.

2. A videoconferencing apparatus, according to claim 1, wherein the controller section includes at least one of a telephone and a wireless remote unit.

3. A videoconferencing apparatus, according to claim 1, wherein the programmable processor circuit is implemented using at least two intercommunicative integrated circuit packages.

4. A videoconferencing apparatus, according to claim 1, wherein the programmable processor circuit is implemented using one integrated circuit package including both the RISC-type processor and the DSP-type processor.

5. A videoconferencing apparatus, according to claim 1, wherein the first and controller sections of the programmable processor circuit are implemented as part of a single integrated circuit.

6. A videoconferencing apparatus, according to claim 1, wherein the processor circuit is programmed to receive a user-generated command that configures the videoconferencing apparatus to automatically answer a call detected over the POTS line.

7. A videoconferencing apparatus, according to claim 1, wherein the processor circuit is programmed to process video received from one of a plurality of video sources and to respond to a remotely generated "select" command causing one of the video sources to be selected by a remotely-located user.

8. A videoconferencing apparatus for communicating video and audio data over a communications channel, comprising:

a video source configured and arranged to capture images and to generate video data representing the images;

an interface circuit, including a modem, configured and arranged to transmit and receive video and audio data over the channel;

a programmable processor circuit having a first section, including a DSP-type processor, configured and arranged to encode and decode video data, including the video data generated by the video source, according to a programmed video-coding recommendation, and having a controller section, including a RISC-type processor, communicatively coupled to the first section, the controller section executing a stored program for controlling operation of the videoconferencing apparatus in response to user-generated commands;

an EEPROM circuit coupled to the programmable processor circuit and arranged for storing the program for controlling operation of the videoconferencing apparatus;

a display driver circuit responsive to the programmable processor circuit and configured and arranged to generate video data for a display; and a housing arrangement, enclosing the video source, the interface circuit, the programmable processor circuit, the EEPROM circuit, the display driver circuit, and constructed and arranged to mount adjustably on the top of the display.

9. A videoconferencing apparatus, according to claim 8, wherein the processor circuit is programmed to receive a user-generated command that configures the videoconferencing apparatus to automatically answer a call detected over the communications channel.

10. A videoconferencing apparatus, according to claim 8, wherein the processor circuit is programmed to process video received from one of a plurality of video sources and to respond to a remotely generated "select" command causing one of the video sources to be selected by a remotely-located user.

11. A videoconferencing apparatus, according to claim 8, wherein the processor circuit is programmed to process video received from one of a plurality of video sources and to respond to a remotely generated "select" command causing one of the video sources to be selected by a remotely-located user, and wherein the processor circuit is further programmed to receive a user-generated command that configures the videoconferencing apparatus to automatically answer a call detected over the communications channel.

12. A videoconferencing apparatus for communicating video and audio data over a communications channel, comprising:

a video source input port configured and arranged to couple video data from a video source, the video data representing images captured by the video source;

an interface circuit, including a modem, configured and arranged to transmit and receive video and audio data over the channel;

a programmable processor circuit having a first section, including a DSP-type processor, configured and arranged to encode and decode video data, including the video data generated by the video source, according to a programmed video-coding recommendation, and having a controller section, including a RISC-type processor, communicatively coupled to the first section, the controller section executing a stored program for controlling operation of the videoconferencing apparatus in response to user-generated commands, the processor circuit being further configured to receive a user-generated command that configures the videoconferencing apparatus to automatically answer a call detected over the communications channel;

an EEPROM circuit coupled to the programmable processor circuit and arranged for storing the program for controlling operation of the videoconferencing apparatus;

a display driver circuit responsive to the programmable processor circuit and configured and arranged to generate video data for a display; and a housing arrangement, enclosing the video source input port, the interface circuit, the programmable processor circuit, the EEPROM circuit, the display driver circuit, and constructed and arranged to mount adjustably on the top of the display.

* * * * *

UNITED STATES PATENT AND TRADEMARK OFFICE
CERTIFICATE OF CORRECTION

PATENT NO. : 6,124,882 Page 1 of 1
DATED : September 26, 2000
INVENTOR(S) : Voois et al.

It is certified that error appears in the above-identified patent and that said Letters Patent is hereby corrected as shown below:

Title page,
Item [63], Related U.S. Application Data, delete the whole paragraph text and replace with the following paragraph:
-- Continuation-in-part of U.S. patent application Ser. No. 08/908,826, filed on Aug. 8, 1997 (now U.S. Pat. No. 5,790,712), which is a continuation of U.S. patent application Ser. No. 08/658,917, filed on May 31, 1996 (now abandoned), which is a continuation of U.S. patent application Ser. No. 08/303,973, filed on Sep. 9, 1994 (now abandoned), which is a continuation of U.S. patent application Ser. No. 07/838,382, filed on Feb. 19, 1992 (now U.S. Pat. No. 5,379,351). --

Column 1,
Lines 4-13, delete the whole paragraph and replace with the following paragraph:
-- This is a Continuation-in-part of U.S. patent application Ser. No. 08/908,826, filed on Aug. 8, 1997 (now U.S. Pat. No. 5,790,712), which is a continuation of U.S. patent application Ser. No. 08/658,917, filed on May 31, 1996 (now abandoned), which is a continuation of U.S. patent application Ser. No. 08/303,973, filed on Sep. 9, 1994 (now abandoned), which is a continuation of U.S. patent application Ser. No. 07/838,382, filed on Feb. 19, 1992 (now U.S. Pat. No. 5,379,351). --

Signed and Sealed this

Ninth Day of August, 2005

JON W. DUDAS
*Director of the United States Patent and Trademark Office*